May 11, 1954 G. W. VON HOFE Re. 23,828

LABELING MACHINE AND METHOD USING LABELS COATED WITH THERMOACTIVATABLE ADHESIVE

Original Filed Dec. 18, 1945 4 Sheets-Sheet 1

George W. von Hofe
INVENTOR.

BY John A. Schleuter
ATTORNEY.

May 11, 1954 G. W. VON HOFE Re. 23,828
LABELING MACHINE AND METHOD USING LABELS COATED WITH THERMOACTIVATABLE ADHESIVE
Original Filed Dec. 18, 1945 4 Sheets-Sheet 2
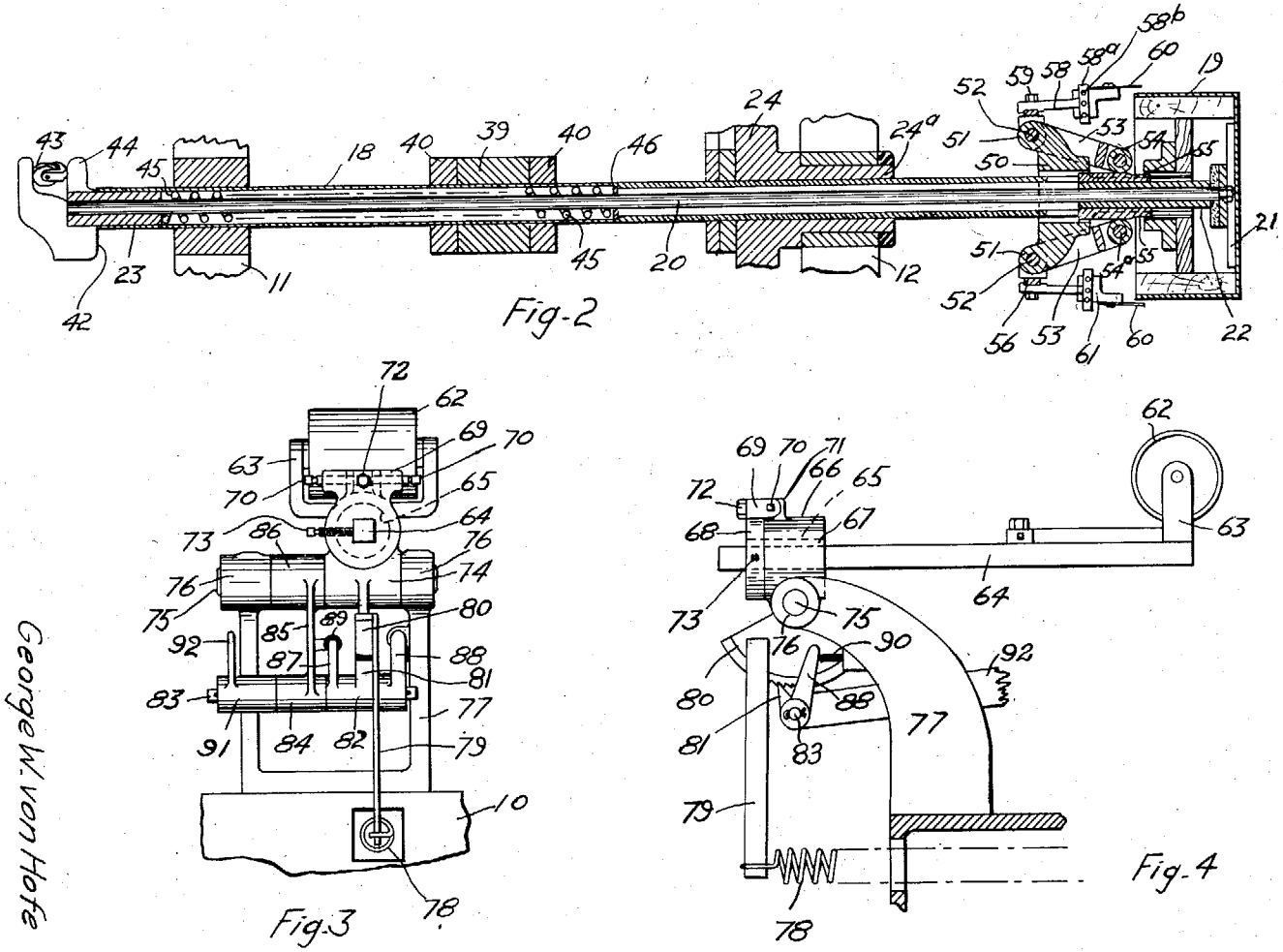
George W. von Hofe
INVENTOR.
BY John A. Schlenker
ATTORNEY.

May 11, 1954 G. W. VON HOFE Re. 23,828
LABELING MACHINE AND METHOD USING LABELS COATED WITH THERMOACTIVATABLE ADHESIVE
Original Filed Dec. 18, 1945 4 Sheets-Sheet 3
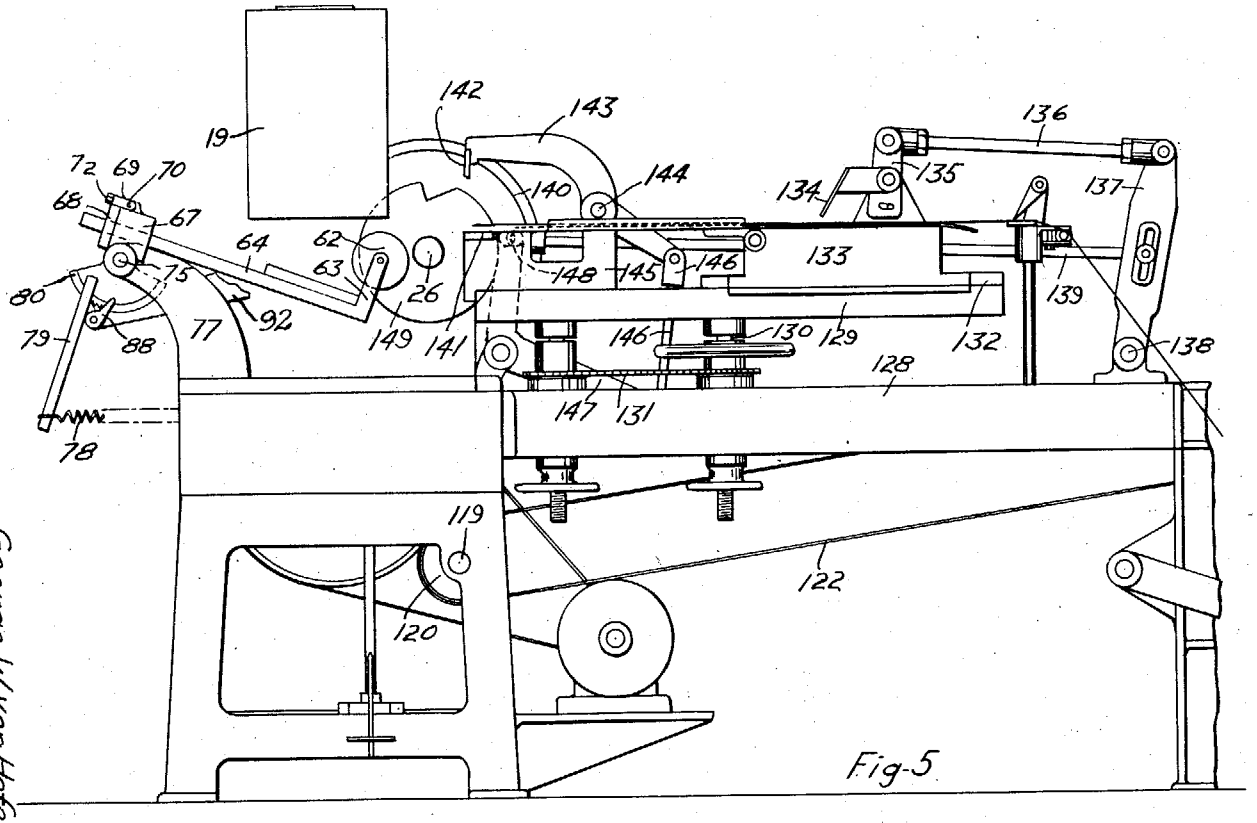
George W. von Hofe
INVENTOR.
BY John A. Rehlenbeck
ATTORNEY.

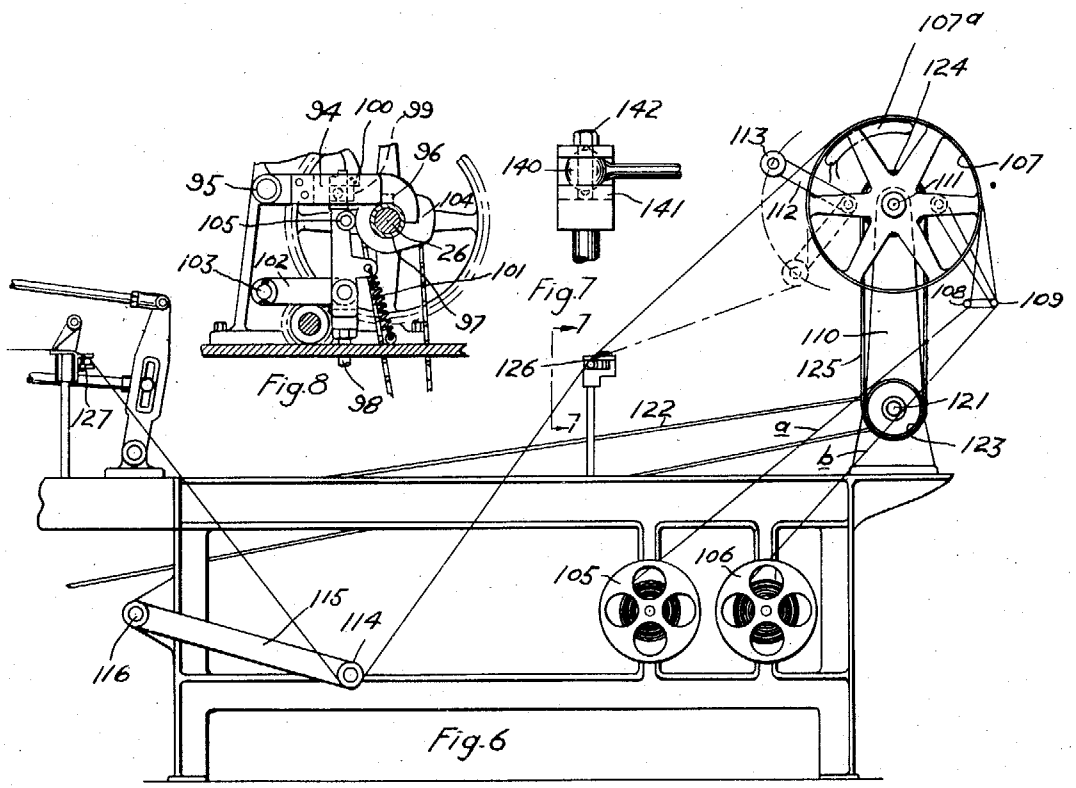
George W. von Hofe
INVENTOR.
BY John A. Tekbenkock
ATTORNEY

Reissued May 11, 1954 Re. 23,828

UNITED STATES PATENT OFFICE 23,828

LABELING MACHINE AND METHOD USING LABELS COATED WITH THERMOACTIVATABLE ADHESIVE

George W. von Hofe, Bound Brook, N. J., assignor to New Jersey Machine Corporation, Hoboken, N. J., a corporation of New Jersey Original No. 2,524,946, dated October 10, 1950, Serial No. 635,657, December 18, 1945. Application for reissue April 14, 1951, Serial No. 221,030

28 Claims. (Cl. 216—29)

Matter enclosed in heavy brackets [ ] appears in the original patent but forms no part of this reissue specification; matter printed in italics indicates the additions made by reissue.

The invention relates to a labeling machine and method using labels coated with thermo-activatable adhesives.

In practice, such adhesives are activated by the application of heat to transform the same from a normal, non-adhesive condition to an adhesive state in which the coatings serve to adhesively attach said labels in place in a manner to carry out the functions thereof. Because of the character of the thermo-activatable adhesives, it is desirable to provide a time interval in which proper tackiness of the activated-adhesive coatings may be developed.

The invention has for its object to provide a novel machine wherein provision is made for activating the adhesive coatings in a simple manner with maximum efficiency.

A further object of the invention is to provide severing means in the novel machine whereby a traveling web of paper, coated with the activatable adhesive, is cut into sections comprising wrappers, labels, and the like.

In addition, the invention provides applying mechanism operating in efficient association with the activating means for applying the adhesively-coated sections in adhesive connection with articles in accordance with the predetermined functions of said sections.

Other objects will appear from the description hereinafter, and the features of novelty will be pointed out in the claims.

In the accompanying drawings which illustrate an example of the invention without defining its limits, Fig. 1 is a side elevation of a machine constructed in accordance with the principle of the invention;

Fig. 2 is a sectional detail on the line 2—2 of Fig. 1;

Fig. 3 is a detail side elevation of the means for pressing the sheet, label or the like into contact with an article;

Fig. 4 is a front elevation of the structure shown in Fig. 3;

Fig. 5 is a front elevation illustrating the applying means, strip severing, and intermittent feeding mechanism which comprises the left side or half of a machine;

Fig. 6 is a front elevation showing the continuously-operating web-feeding mechanism mounted at the right hand end of the machine;

Fig. 7 is an enlarged detail taken on the line 7—7 of Fig. 6, and

Fig. 8 is a section on the line 8—8 of Fig. 1.

Figure 1:
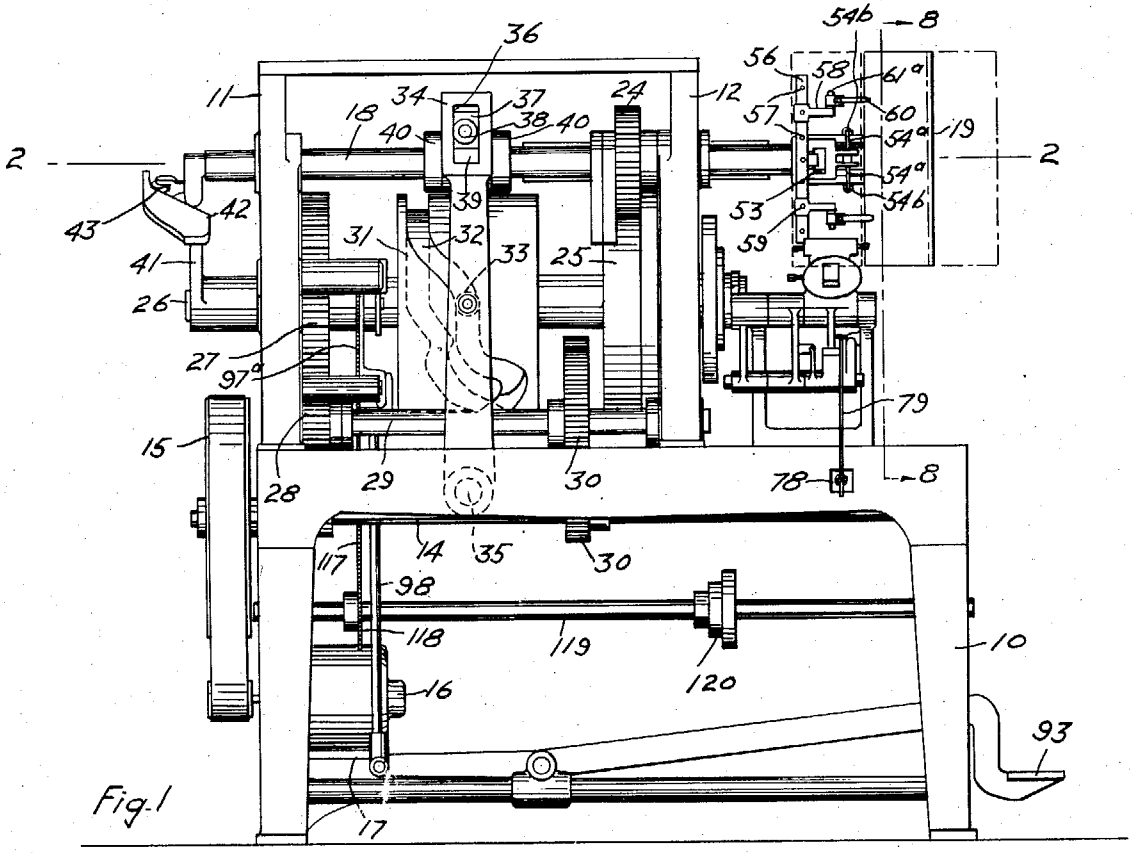

In accordance with the present invention, I provide an installation which includes means for activating normally-inactive adhesive material with which one of the surfaces of a strip or strips of paper is coated, said strip or strips being preferably fed from a roll or rolls in web form, to the mechanism which, in the illustrated example, performs the applying operation. In the machine shown in the drawing, blanks in folded conditions are placed manually by the operative upon a form or core; after which, a foot pedal or other manually-operable device is actuated by the operator to cause the applying mechanism to perform its complete cycle of operations. As such mechanism performs its functions, the paper is fed by an intermittent feeding device that engages the gummed side of the *sheet or* web of paper, and advances it to the article to be labeled. In the meantime, the supply of coated paper is continuously fed into operative relation with activating means whereby said adhesive coating is heated and thereby transformed from its normal adhesively-inactive condition to an activated adhesive state. A strip severing means is actuated in predetermined-timed relationship with the wrapping mechanism to sever from the *sheet or* web a section of paper of the proper length for application to the article, for instance, as a wrapper or as a label. The successful operation of the instant machine depends in a large measure upon the presentation of the strip with the activated adhesive thereon in such condition that, when the section is applied to the article, the adhesive coating thereof will be in the proper "tacky" condition to adhere properly to said article. In order that this condition may be attained, the activation of the adhesive coating takes place at a predetermined distance from the applying mechanism so that a certain time interval will elapse between activation of the adhesive coating material and application of the label to permit said activated coating material to develop a degree of maximum adhesiveness; with this arrangement, a length of adhesively-coated paper is, in effect, stored for a time to permit the conditioning of the activated-adhesive coating material and paper in order to prepare the same for application at the applying station. With the instant machine, the aforesaid time interval may vary considerably due to the fact that the placing of the article upon the form and the actuation of the foot pedal or other device which causes the applying mechanism to start functioning is performed manually. Furthermore, as the operative must, from time to time, remove the article subsequent to the application of the aforesaid sections of paper, and secure a new supply of articles, there are times when the time interval between the activation step and the application of the strip may be of relatively long duration. In any case, however, this time interval is of such duration that the activated coating of adhesive will reach a state of maximum adhesiveness by the time the applying station is reached.

The installation, shown by way of example in the accompanying drawings will first be described briefly. It includes a suitable support, connected to the main frame of the machine, upon which a web or webs of paper are mounted, preferably in the form of rolls. The web or webs is or are withdrawn from the roll or rolls to a continuously-operating web-feeding mechanism, which functions to pull the web or webs from the roll or rolls. The web then passes to a web tensioner and thence to an intermittent feeding mechanism which conveys the end of the activated web to the labeling mechanism. Located between the intermittent feeding device and the labeling mechanism is a strip severing means which is automatically operated in timed relationship with the labeling and the intermittent feeding device, to sever from the web a strip of paper of the proper length to constitute, for instance, a label for the sides of the boxes. The labeling mechanism comprises a block, or core, as it is commonly called, which core is shaped and dimensioned according to the shape and size of the article to be labeled. This core has associated therewith means for holding the article in position upon the core during the performance of the machine's cycle of operations. As the end of the activated paper web is fed to the labeling station, its activated side is moved, by an automatically-operated roller, into engagement with an article, which has been placed upon the core by the operative and the core is rotated. During the rotation of the core, said roller holds the web of paper in contact with the sides of the article upon the rotating core, thus pressing the activated strip upon the sides of the blank. During the rotation of the core, the engagement of the web between the roller and blank causes the web to be drawn into the labeling mechanism. When the core has nearly completed one revolution, the strip-severing means, above referred to, is actuated to sever from the web a label of a desired length to properly label the article. At the end of a complete revolution of the core, it advances and the work is removed by the operative.

For convenience and clarity of description, the machine will be described in detail under the following headings:

The labeling mechanism—A.
Paper supplying, activating, and tensioning means—B.
The intermittent feeding device—C.
The strip severing means—D.
Operation.

APPLYING MECHANISM—A (Figs. 1 to 4, inclusive)

The labeling mechanism comprises a main frame consisting of a base 10 and a plurality of brackets 11 and 12, secured to said base and projecting upwardly therefrom for supporting the various mechanisms presently to be described. Rotatably mounted in suitable bearings on the base or lower frame 10 is a main driving shaft 14, having a pulley 15 secured thereto by which the machine may be driven from a line shaft or from an electric motor 16, supported upon a shelf or bracket 17, formed integrally with, or secured to, the base 10.

Mounted in suitable bearings in the brackets 11 and 12 is a tubular shaft 18 (see Figs. 1 and 2), having detachably secured to the front end thereof a core or form 19; the core is in the shape of a rectangular prism and is dimensioned according to the size of the articles to be labeled or wrapped. Mounted within the tubular shaft is a solid shaft or rod 20, which has secured to its front end an ejecting plate 21. The shaft 20 is supported at its ends by sleeves 22, 23, which are interposed between said shaft and the tubular shaft 18. The tubular shaft 18 has slidably secured thereto an intermittent gear 24 having a sleeve-like extension 24-a which passes through and is rotatably mounted in a bearing formed adjacent to the upper end of the bracket 12. Meshing with the gear 24 is a cooperating, intermittent gear 25, secured upon a cam shaft 26; said cam shaft being rotatably supported in suitable bearings, provided in the brackets 11 and 12, below the tubular shaft 18. Secured to the cam shaft 26 adjacent to the bracket 11 is a gear 27 which meshes with and is driven by the gear 28, mounted upon a jack shaft 29, said jack shaft being driven from the main shaft 14 by means of the gearing 30.

Mounted upon the cam shaft 26 is a main cam 31, provided with a cam groove 32, in which is engaged a roller 33. The roller 33 is mounted on an oscillating lever 34, between the ends of said lever. One end of the lever 34 is pivotally mounted at 35 upon the frame 10 and the upper end of said lever is provided with an elongated guideway 36. Slidably mounted in the guideway 36 is a bearing block 37, in which is rotatably mounted a pin or roller 38, projecting laterally from a sleeve 39 loosely mounted upon the tubular shaft 18, and held against movement longitudinally of said shaft, by means of a pair of spaced collars 40.

A second cam 41 is secured upon the outer projecting end of the cam shaft 26. This cam is in the form of a crank arm and is provided at its outer end with a cam face 42, adapted to engage at certain parts of its revolution with a cam roller 43. The cam roller 43 is mounted upon a laterally projecting arm 44, formed integrally with the sleeve 23 hereinbefore referred to. A spring 45 is mounted within the tubular shaft 18 and is coiled about the shaft or rod 20. This spring has one end thereof in engagement with the inner end of the sleeve 23 and its other end in engagement with an abutment 46, fixed within the tubular shaft 18, thus serving normally to urge the rod 20, with the ejecting plate 21 thereof, towards the left in Fig. 2 of the drawings. In this position, it will be noted that the ejecting plate 21 is in alignment with the front end of the core 19.

Suitably secured to the front end of the tubular shaft 18 and held fixed against movement relatively thereto, is a bracket 50, having a pair of diametrically-opposed bearing bosses 51, in each of which is mounted a pivot pin 52. Each pivot pin 52 serves as a pivotal support for a lever 53, both ends of which are yoked. One of these yoked ends, as will be seen from Fig. 1, straddles the boss 51 and the other yoked end carries a pin 54-a, the ends of which project outwardly beyond the sides of the yoked lever for a purpose which will presently appear. Between the yoke jaws of the lever said pin has rotatably supported on it a roller 54. The roller 54 engages with a slide cam 55, secured to the sleeve 22, which sleeve as heretofore described is secured to the sliding shaft or rod 20. Secured to the yoked end of the lever 53, which straddles the boss 51, is a bar 56, preferably provided with a plurality of spaced holes 57, in which the finger carrying arms 58 are adapted to be secured by any suitable means, such as the bolts 59. Each of the finger carrying arms 58 carries at its outer end a gripping finger 60, which fingers are adapted, in certain positions of the core 19, to project over and engage with an article placed upon the core. In order to insure that the gripping fingers 60 will engage the article with sufficient force to hold said article securely upon the core 19 the similarly located projecting ends of the pins 54–a carried by the forward ends of the levers 53 are connected by tension springs 54–b, said springs also serving to hold the rollers 54 in engagement with the slide cams 55. When the slide cams 55 move rearwardly due to the roll 43 falling off the segment 42, the rollers 54 are forced by the springs 54–a to follow the drop of the cams. The parts are so constructed that before the rollers 54 reach the lowermost points of the cams the fingers 60 will engage the article, the spring 54–b thus holding said fingers 60 under tension and in engagement with said article. In order to adjust the position of the gripping fingers 60 relatively to the tubular shaft to compensate for cores of different sizes, the finger-carrying arms 58 are provided at their outer ends with an elongated head 58–a, having a plurality of spaced holes 58–b therein, and the fingers 60 are secured to a bracket 61, which in turn is secured by means of a screw 61–a adapted to be screwed into one of the spaced holes 59–b.

As hereinbefore set forth in the brief description of the machine, the paper strip has its activated side moved into engagement with the article by means of a mechanically actuated roller. This roller is most clearly shown in Figs. 3 and 4 of the drawings, and is indicated by the reference character 62. It is rotatably mounted between the arms of a yoke member 63, the latter being secured at the outer end of a bar 64. The bar 64, which, as clearly shown in Fig. 3 of the drawing, is of rectangular cross section, is mounted for longitudinal sliding adjustment within the rectangular bore of a sleeve or bushing 65, mounted for rotatable adjustment in the boss 66 of an oscillating bracket 67. The sleeve 65 is provided with an enlarged end or head 68, having formed integrally therewith at its upper end a pair of transversely spaced lugs 69, each of said lugs having screwed therein an adjusting set screw 70. The ends of said set screws are adapted to engage with a lug 71, projecting upwardly from the top of the bracket 67. A locking bolt 72 is screwed into the lug 71 and passes through an elongated slot in the upper end of the enlarged head 68 of sleeve 65 and serves to lock said sleeve 65 in adjusted position. For the purpose of securing the bar 64 in adjusted position longitudinally of the sleeve 65, a set screw 73 is provided. The oscillating bracket 67 is provided with a depending boss 74, which extends transversely of the boss 66 and is mounted upon a shaft 75, supported in bearings 76, provided at the upper ends of the arms of a yoke shaped bracket 77, the latter being secured to base 10. The oscillating bracket 67 is normally urged in a counterclockwise direction, Fig. 4, to hold said roller 62 in engagement with the core 19, by the action of a coiled tension spring 78, one end of which is secured to the lower end of a rod 79, secured to a ratchet segment 80 presently to be described. At predetermined intervals, the bracket 67 is intermittently actuated from the cam shaft 26 by means of a pawl 81, which engages with the ratchet segment 80, the latter being formed integrally with the oscillating bracket 67, and depending from the boss 74 thereof. The pawl 81 projects from a boss 82, rotatably mounted upon a short shaft 83, carried in a bearing 84 of a bracket 85, supported by means of the boss 86 upon the shaft 75, this shaft being the one upon which the transverse boss 74 of the oscillating bracket 67 is mounted. The boss 82 has a pair of upwardly projecting arms 87, 88, the arm 87 having secured thereto one end of a spring 89, the other end of which is secured to a lug projecting laterally from the bracket 65, and said spring serving to hold the pawl 81 normally in engagement with the ratchet segment 80. The arm 88 just referred to is adapted to engage with an adjustable stop 90, secured in the bracket 77, to cause the pawl 81 to become disengaged from the ratchet segment at proper predetermined times. The short shaft 83 passes through a boss 91, at the lower end of a cam yoke 92, the upper end of which is in engagement with the cam shaft 26 and is caused to be oscillated by means of a cam and roller (not shown).

The construction just described enables a very accurate adjustment of the roller 62 relative to the article to be secured and presents a marked improvement over existing constructions.

The main shaft 14 of the machine is preferably rotated continuously and the actuation of the various parts is effected from the cam shaft 26. Rotation of the cam shaft is controlled by a one revolution clutch which is adapted to be thrown into operation by the depression of the pedal 93. After the cam shaft has completed a full revolution, during which the applying mechanism has performed its full cycle of operations the clutch is caused to be automatically disengaged. As shown in Figs. 1 and 8, the one revolution clutch is a clutch of the knife-edged type and consists of an arm 94, one end of which is pivotally mounted upon a laterally projecting boss 95 of the bracket 11. The other end of said arm is adapted to rest by gravity upon the periphery of a boss of the cam 31; the free end of the arm being curved to fit about said periphery. The curved end of the arm 94 is wedge or knife-shaped and is adapted to engage a pin or key 96 slidably mounted within the boss 97. A spring (not shown) normally urges the key 96 outwardly of said boss and into a recess provided in a sprocket 97–a secured to the gear 27 by which gear the cam shaft is driven by the gear 28. When the wedge-shaped outer end of the curved arm 94 is in its lowermost position as shown in Fig. 8, it engages within a slot or groove of the key 96 to cause the key to be moved out of engagement with the sprocket thereby uncoupling the clutch. The placing of the clutch in operative condition, is brought about by depressing pedal lever 93. Said lever 93 has connected to its inner end, the lower end of a connecting rod 98, the upper end of which has secured thereto a laterally projecting block 99 adapted to engage a cooperating block 100 which projects laterally from the side of the arm 94. A spring 101 has one end thereof anchored to the framework of the machine and the other end connected with the connecting rod 98 and tends to hold the rod 98 in its lowermost position, in which position, the knife-edge of the arm 94 is in engagement with the key 96.

In order to prevent the continuous operation of the machine even though the operator may hold the pedal 93 depressed, and to insure that the one revolution clutch will function to stop the rotation of the cam shaft upon completion of the full cycle of operating of the labeling devices, the rod 98 is supported for transverse swinging movement upon a link 102 one end of which is pivotally connected to said rod and the other end of which is pivotally mounted in a laterally projecting boss 103 of the bracket 11. A cam 104 is secured to the cam shaft 26 for engagement with a roller 105 projecting laterally from the rod 98 above the point of the pivotal connection therewith of the link 102; the throw of the cam 104 engaging the roller 105 and moving the rod 98 so that the block 99 on said rod will be moved out of alignment with the block 100, thereby insuring that the knife-edge of the arm 94 will be in position to cause the disengagement of the clutch when the cam shaft completes its full revolution.

Operation of the knife clutch will be readily understood, depression of the pedal 93 by the operator causing the member 94 to be raised out of contact with the sliding key 96 and allowing the key to be forced by the action of its spring into the recess of the sprocket 97–a thereby to lock cam 31, which is secured to the cam shaft 26, and the sprocket 97–a together and to cause the cam shaft 26 to be rotated. As the cam shaft completes its revolution, the wedge-shaped end of the arm 94 engages the key and forces it against the action of this spring to cause the clutch to be disengaged. If the operator holds the pedal 93 depressed until after the cam shaft has completed its revolution, the operation of the cam 104 will insure the stopping of the cam shaft at the end of the machine's cycle, and, in order to cause the machine again to become operative, it will be necessary for the operator to release the pedal and then depress it again before the clutch can be coupled.

PAPER SUPPLYING, ACTIVATING, AND TENSIONING MEANS—B

The paper web may be fed to the machine as a single strip of printed paper or if it is desired to give the article a distinctive appearance, two strips of paper of different colors or printings may be provided, one of which slightly overlaps the other, or one of which may be a narrow strip laid on as a stripe. In Fig. 6, I have shown the machine as being provided with two strips or webs of paper, a, b, which strips are led from rolls supported in the reels 105, 106, respectively, and over a paper feeding and activating drum 107, of relatively large diameter. Suitable activating means is operatively located relatively to the activating drum 107 either externally or internally thereof or in both external and internal relation thereto as may be preferred, said activating means being diagrammatically illustrated in the form of heat developing means. In the example shown in Fig. 6, the heat developing means is shown at 107–a within the drum 107 and is indicated as an electrically-operated device located in a suitably controlled electrical circuit.

It will be understood that other types of heating devices may be substituted and that the latter may be otherwise located within the drum 107 or in external operative relation thereto. Guides 108, 109, are provided for the webs a and b, respectively, said guides being suitably supported from the standard 110 in which the shaft 111 of the drum 107 is mounted. In order to insure that the adhesive coatings of the paper webs will be properly activated by the drum 107, i. e., for the time durations required or deemed most desirable in any given case, the following mechanism is provided: Pivotally mounted for adjustment upon a lateral extension of the standard 110 is a roller supporting arm 112, carrying at its outer end a roller 113. By shifting the roller 113 into any selected position between the full-line and dotted positions shown, the webs are retained in engagement with the heating surface for varying periods of time. The arm 112 may be held in the selected adjusted position by any suitable clamping means (not shown). A follower roll 114 is mounted at the free end of an arm 115, the other end of which is pivotally supported upon a stud or pin 116. *The roll 114 and arm 115 is moved about pivot pin 116 as the activated paper strip is withdrawn at the point of application and replenished by the drum 107, the range of movement of the roll 114 being limited in one direction by the floor or base on which the machine stands (note Fig. 6). Thus, as the article being labeled or wrapped consumes a certain length of the activated strip from the loop in which the roll 114 rests, the roll 114 and arm 115 will be raised and thereby place the leg of the loop extending from the drum 107 under such tension as to create sufficient frictional contact between the paper strip and the surface of the drum to enable the latter to feed more of the paper strip into the loop. As the drum 107 feeds the activated paper into the loop, the roll 114 will be lowered until it again comes into contact with the floor or base on which the machine rests. When this occurs, the leg of the loop extending from the drum 107 will be released from the tension created by the weight of the roll 114 and arm 115, thereby reducing the frictional contact of the paper strip with the surface of drum 107 to the extent that, while drum 107 continues its rotative movement, it is no longer able to feed activated paper into the loop. In other words, by reason of the roll 114 and arm 115, the drum 107 will only feed into the loop sufficient of the activated strip to replenish the amount taken out by the article during each cycle and when such amount of paper has been so fed, there is caused to be a dwell in the feeding of the strips or paper webs a, b, between the application of several strip portions to successive articles by the roller 62. Because of such periods of dwell, the heating device on drum 107 is not of such high temperature as to cause harm by charring or burning to either the adhesive or the strip during a period of dwell, but has a temperature within a range corresponding with the activating or softening range of the adhesive material on the strip.*

The drum 107 is driven by the following means: The sprocket 97–a, see Fig. 1, with which the key 96 of the knife-edge clutch engages, has trained about it a chain 117, which drives a sprocket 118 mounted upon a countershaft 119, journalled in the lower frame of the machine. Secured upon the countershaft 119 is a step cone pulley 120. Trained about the pulley 120 and a pulley secured to a shaft 121 (Fig. 6), journalled in the standard 110, is a belt 122, which causes the shaft 121 to be driven from the associated mechanism illustrated in Fig. 5. *By changing the belt 122 from one step to another of the pulley 120, the*

*rapidity with which the drum 107 feeds the activated paper into the loop controlled by the roll 114 and arm 115 can be adjusted.* Secured to the shaft 121 is a second pulley 123 above which is a pulley 124, secured to the drum shaft [11] *111*. About these pulleys is trained a belt 125 for driving the drum from the aforesaid associated mechanism. As the paper *in its feed* passes from the activating drum 107 to the intermittent feeding device *C*, it is trained over guides 126 and 127 which are of similar construction and consist of a laterally-extending arm suitably supported from the framework. *As is shown more clearly in Fig. 7 of the drawings, each* [Each] arm is preferably provided with a ball-shaped end 140 clamped between a pair of recessed plates 141, said plates being clamped in engagement with the end 140 by a bolt 142. The ball-shaped end of each arm cooperates with the recessed plates to permit universal adjustment of the arms 126, 127. By inclining such arms as required, the paper can be made to track true, and so that side-wise creeping thereof can readily be prevented. It will be understood that the arms 126, 127, are oppositely arranged, that is with the ball end of the arm 126 located adjacent to one side of the frame while the ball end of the arm 127 is at the other side of the frame.

INTERMITTENT FEEDING DEVICE—C

In its passage from the activating station to the labeling mechanism the web is engaged and fed to the labeling mechanism as required by an intermittent feeding device, which may be of any suitable construction, but which as shown, comprises the following parts: Adjustably mounted upon a sub-frame 128, extending laterally from the main frame 10 is a table 129, any suitable adjusting devices, such as the screws 130 connected for simultaneous movement by the sprocket chain 131 being provided for moving the table vertically. Mounted on a suitable guide 132, provided upon the table 129, is a slide 133, carrying a paper gripping member 134, mounted for limited oscillation upon said slide by means of a rocking arm 135. The rocking arm 135 is connected by a rod 136 with an oscillating lever 137 pivotally mounted at its lower end as at 138. One end of an actuating rod 139 is connected to the oscillating lever between the ends of said lever, the other end of said rod being supported in any suitable manner, and being provided with a roller which engages with a cam 140, secured to the cam shaft 26, which cam is provided with a cam race of suitable contour for causing the paper gripping member 134 to be oscillated and the slide 133 to be reciprocated in properly timed relationship with the manipulation of the core 19 to feed the paper to said core.

STRIP SEVERING DEVICE—D

For severing from the web the label or its equivalent that is to be secured to the article, I have shown a device which includes a reaction block or plate 141 of hardened steel, secured to the front end of the table 129. A chopping blade 142 is mounted, for movement into and out of contact with the plate 141, at the free end of one arm of a two armed lever 143, pivotally supported, as at 144, on a bracket 145, mounted on the table 129. The other end of the two armed lever has connected therewith one end of a connecting rod 146, the other end of which rod is connected with one end of a bell crank lever 147, the other end of which carries a cam roller 148, held in contacting engagement by any suitable means, with the periphery of a cam 149, secured to the cam shaft 26.

OPERATION

It will be understood that before a job is started upon the machine, a core 19 of the proper size and shape is secured to the hollow tubular shaft 18, and other adjustable parts of the labeling machine will be adjusted in accordance with the size and shape of the article to be labeled. At the beginning of a cycle of operations of the machine the several heating or other activating devices are in operation, and the core 19 is in the position indicated by the full lines in Fig. 1. The operator positioned in front of the machine will place an article upon the core 19. The pedal lever 93 is now depressed by the operator, thus causing the one revolution clutch to become operative to rotate the cam shaft 26. As the cam shaft 26 begins its rotation, the cam 42 moves out of engagement with the cam roller 43, thus permitting the shaft or rod 20 to be moved rearwardly relatively to the tubular shaft 18 by the spring 45. When this occurs, the cams 55 (Fig. 2), are moved rearwardly and the rollers 54 ride down off the cams 55, thus permitting the yoked levers 53 and the finger carrying arms 58 to move inwardly and bring the fingers 60 into engagement with the article upon the core 19 and to hold said article securely in position upon said core. Immediately after the fingers 60 grip the article, the rotation of the cam shaft 26 causes the tubular shaft 18 to be withdrawn by the action of the cam 31 and associated parts to bring the core rearwardly to the dotted line position shown in Fig. 1, in which position the core is in alignment with the roller 62. The web feeding mechanism now thrusts the end of an activated label between the roller 62 and the article upon the core 19, the roller 62 at this time being held, by the pawl 81, against the action of the spring 78, in its lowered position. The pawl 81 and ratchet 80 is now released by the cam yoke 92, thereby permitting the spring 78 to activate the bracket 67 about the shaft 75 in a counterclockwise direction, thus moving the roller upwardly and holding the activated side of the label against the article. Just as this occurs, the intermittent gearing 24, 25, becomes operative to rotate the tubular shaft. Upon the completion of a full revolution of said shaft, the pawl 81 becomes active to cause the roller 62 to be moved to its lower inoperative position, and the cam 31 becomes operative to move the core 19 forwardly. Just as the core 19 reaches the extreme forward position, the cam 42 becomes operative to hold the rod 20 against the action of the spring 45 and thereby cause the ejector plate 21 to remain stationary as the core 19 is retracted, thereby stripping the labeled article off the core. After the article is removed from the core and the tubular shaft and core are retracted, the cam roll 43 follows the inclined portion of the cam face 42 and comes to rest in the starting position indicated in Figs. 1 and 2 of the drawings. The complete cycle of the machine's operation is now completed and the one-revolution clutch operates automatically to stop the rotation of the cam shaft. All of the parts are at rest in the starting position and will remain at rest until the clutch pedal 93 is again depressed.

It will be understood that as the coated paper travels over the activating roll 107, the adhesive coating thereof will be subjected to the heating influence of the activating device 107-a and, accordingly, will be transformed from a non-adhesive condition to an adhesive state. As the paper continues to travel from the activating roll to the point of application in the machine, the activated coating will become properly tacky and brought to a condition of maximum adhesiveness. In other words, the time period which elapses between the activation of the adhesive coating and the application of the paper may be termed a storage period during which said coating develops its adhesiveness to a maximum degree.

While the embodiment of the invention herein disclosed is a satisfactory constructional example thereof, it will be understood that the principles of the invention are not limited to the specific constructional details illustrated but that many changes, variations, and modifications may be made without departing from the spirit of the invention.

I claim:

1. In a machine of the kind described, the combination of means for supporting a continuous strip in roll form, said strip being coated on one surface with a thermo-activatable adhesive material, heating means, feeding means for conveying said strip from said roll past said heating means, said feeding means including a rotatable cylindrical drum whose peripheral strip-supporting surface is heated by said heating means, and adjustable means coacting with said feeding means for varying the length of the strip section which is in contact with said drum surface at a given moment.

2. In a machine of the kind described, the combination of means for supporting a continuous strip in roll form, said strip being coated on one surface with a thermo-activatable adhesive material, heating means, feeding means for conveying said strip from said roll past said heating means, said feeding means including a rotatable cylindrical drum whose peripheral strip-supporting surface is heated by said heating means, and means coacting with said feeding means for varying the length of the strip section which is in contact with said drum surface at a given moment, said last-named means comprising a roller mounted for adjustment toward and away from said drum surface and adapted to bear against said strip.

3. In a machine of the kind described, the combination of means for mounting a continuous strip in roll form, said strip being coated with a thermo-activatable adhesive, *an elongated* heating means for progressively activating said adhesive as the strip is fed from said roll, *means for progressively feeding the strip into engagement with said heating means, means for positively pressing an elongated portion of said strip into engagement with said heating means without substantially effecting the rate of speed of said strip by said feeding means,* means for feeding the activated portion of said strip to a point of use spaced from said heating means, and severing means between said heating means and said point of use adapted to cut off an activated section of said strip.

4. In a machine of the kind described, the combination of means for mounting a continuous strip in roll form, said strip being coated with a thermo-activatable adhesive, means for conveying said strip from said roll to a remote point of use including a convex arcuate strip-supporting surface with which the strip is in contact during part of its travel from said roll to said point of use, means associated with said arcuate surface for heating *the same* and thereby activating said strip in a progressive fashion while it is in contact with said arcuate surface, and severing means adjacent to the point of use for cutting off an activated end section of said strip.

5. The method of attaching adhesively coated sheet material to articles, comprising the steps of continuously feeding a strip of thermo-activatable adhesive coated sheet material over a support, pressing the strip against the support during its passage thereover and at the same time applying heat thereto to activate in a progressive fashion successive portions of the coating thereon, storing the activated portion of the strip *for a substantial interval greater than a plurality of the intervals utilized in attaching the activated strip to successive articles* in a region *free from such heat and* intermediate its place of activation and a place of use, and then applying an advanced end of the activated strip to an article.

6. In a machine of the kind described, the combination of means for separately supporting at least two strips each of which is in roll form and is coated on one surface with a thermo-activatable adhesive, means for conveying said strips from said rolls into an overlapping relation in which at least one longitudinal edge of one strip is offset from a longitudinal edge of the other while the coated surfaces face in the same direction, and heating means for progressively activating both of said coatings on said overlapping strips to effect the union of said strips and to provide a composite strip having an exposed adhesively activated coating by which said composite strip may be secured to an article.

7. In a machine of the kind described, the combination of means for separately supporting at least two strips each of which is in roll form and is coated on one surface with a thermo-activatable adhesive, means for conveying said strips from said rolls into an overlapping relation in which said coated surfaces face in the same direction, one of said strips being narrower than the other whereby at least one longitudinal edge of one strip is offset from a longitudinal edge of the other, and heating means for progressively activating both of said coatings on said overlapping strips to effect the union of said strips and to provide a composite strip having an exposed adhesively activated coating by which said composite strip may be secured to an article.

8. In a mechanism for supplying adhesively coated sheet material to be affixed to articles, *means for mounting* a supply in the form of a continuous strip coated with a thermo-activatable adhesive, a rotatable means having an endless strip-supporting surface for conveying said strip toward a point of discharge, and stationary heating means located within the area defined by said surface and adapted to supply sufficient heat through said surface to activate the coating on the strip section which is in engagement with said surface.

9. In a mechanism for supplying adhesively coated sheet material to be affixed to articles, *means for mounting* a supply of sheet material coated with a thermo-activatable adhesive, means having a *movable elongated* sheet-supporting surface for conveying said sheet material toward a point of discharge, heating means associated with said surface for activating the coating on the sheet material during the engagement thereof with said surface, and tension means engaging said sheet material and maintaining the latter under tension while in contact with said surface.

10. In a machine for activating a continuous strip coated with thermo-activatable adhesive, a *rotatably mounted* cylindrical heating means, and means for rotating said cylindrical means about its axis for tensioning and bending said strip around said heating means with the uncoated side of said strip against the heating means to maintain each successive portion of said strip in contact with said heating means for a predetermined interval.

11. In a machine for activating a continuous strip coated with thermo-activatable adhesive, means having [a] *an elongated* heated surface, and means for tensioning said strip with the uncoated side of said strip against the heated surface, said tensioning means *comprising a plurality of means located in back of and in advance of the portion of said surface engaged by said strip, the means in advance of said portion exerting a longitudinal pull on said strip and all of such means changing the path of feed of said strip while passing over said surface and* maintaining successive portions of said strip passing over said surface in contact with the latter for a predetermined interval.

12. The method of attaching thermo-activatable adhesive coated sheet material to articles, comprising the steps of pressing such material against a support and at the same time applying heat thereto to activate the coating thereon, storing the material to allow the sheet and its activated coating to cool below the activating temperature and to allow the coating to develop an enhanced tackiness, and then applying the activated material to an article.

13. The method of attaching thermo-activatable adhesive coated sheet material to articles, comprising the steps of advancing such material under tension past heating means capable of subjecting the adhesive coating thereon to an activating temperature substantially above room temperature so that successive portions of said coating will be activated in a progressive fashion, then storing the sheet material for a sufficient period to enable its temperature to drop substantially below said activating temperature, and then applying the adhesively activated cooled material to an article.

14. The method of preparing for use a web of thin flexible material coated on one side thereof with an inactive but thermally activatable adhesive coating, which comprises the steps of progressively heating successive areas of said material and the coating thereon to an activating temperature sufficiently high to transform said coating from an inactive state to a state of adhesiveness, and then before using the activated material allowing it and the activated adhesive coating thereon to cool to a temperature appreciably below said activating temperature.

15. The method of adhesively attaching sheet material to articles, comprising the steps of feeding a strip of thermo-activatable adhesive coated sheet material past a heating station to activate successive areas of the strip, storing the activated material for an appreciable time period to allow it to cool and to achieve an enhanced substantial tackiness, and only then applying the activated material to an article.

*16. Apparatus for applying a thermo-activatable adhesive coated strip from a continuous supply thereof to successive articles, comprising means for supporting said supply, means for intermittently feeding the strip from said supply to a predetermined application point, means for*

*conveying separate articles to said application point, a heat source intermediate said supply and said application point, and spaced from the latter, means for guiding said strip into heat exchanging relation with said heat source, so that the latter progressively activates the adhesive as the strip is fed from said supply, means for selectively controlling the heat of said heat source to effect substantially uniform softening of the adhesive coating lengthwise of the strip, severing means between said source of heat and said point of application adapted to cut off an activated section of said strip, means for guiding the leading activated portion of said strip to and past said severing means and to a position to be adhered to the article at said application point, and means at said application point for adhering the leading activated portion of said strip to the article.*

*17. Apparatus for applying thermo-activatable adhesive coated sheet material from a continuous supply thereof to successive articles, comprising means for supporting said supply, means for intermittently feeding the sheet material from said supply to a predetermined application point, means for conveying an article to said application point, an elongated surface between said supply and said application point along the line of feed of said sheet from said supply to said application point, means for heating said surface to a temperature sufficient to activate the adhesive material on said sheet, means for pressing said sheet against said heated surface to activate the adhesive coating while feeding said sheet from said supply, severing means between said heated surface and said point of application adapted to cut off an activated section of said sheet, and means separate from said feeding means and located between said heated surface and said severing means for engaging the uncoated surface of said sheet to guide said sheet from said heated surface to said severing means.*

*18. Apparatus for applying thermo-activatable adhesive coated sheet material from a continuous supply thereof to successive articles, comprising means for supporting said supply, means for intermittently feeding the sheet material from said supply to a predetermined application point, means for conveying an article to said application point, a heat source intermediate said supply and said application point and spaced from the latter, means for guiding said sheet into heat exchanging relation with said heat source so that the latter progressively activates the adhesive as the sheet is fed from said supply, said guiding means and said heat source being relatively movable to vary the heat exchange relation between said heat source and the sheet, means for selectively controlling the heat of said heat source to effect substantially uniform softening of the adhesive coating lengthwise of the sheet, means for severing predetermined lengths from the leading end of said sheet, and means for pressing said cut lengths into adhering relation with the articles to be sealed.*

*19. A method of applying tape having a thermoplastic coating from a continuous supply thereof to successive articles to be sealed which comprises subjecting the coating on said tape to a controlled temperature substantially higher than the softening range thereof while feeding said tape in positively pressed engagement with an elongated heated surface at a speed sufficient to effect softening of successive areas of said coating without charring or burning, guiding said heated tape to a predetermined point of applica-* tion into sealing contact with successive said articles, severing the leading end of said tape in accordance with the length of said articles to be sealed, causing said tape to dwell for a predetermined interval in each cycle of application thereof to successive said articles, and maintaining said temperature within a range correlated with the softening range of said coating to prevent charring or burning of the portion of said coating subjected to said temperature during each said dwell.

20. Apparatus for applying thermo-activatable adhesive coated sheet material from a continuous supply thereof to successive articles, comprising means for supporting said supply, means for supporting articles to which lengths of said sheet material are to be adhered, means for intermittently feeding the sheet material from said supply to an article, means for applying heat to said sheet material so that the adhesive coating thereon is progressively activated as the sheet is fed from said supply, means separate from said feeding means for guiding the activated portion of said sheet by contact with the uncoated surface thereof from said heat applying means to the article, said guiding means controlling the path of feed of the leading activated portion of said sheet to and past severing means into adhering relation with such article, means for severing predetermined lengths from the leading end of said sheet, and means for pressing a cut length of said sheet into adhering engagement with such article.

21. A method of applying tape having a thermoplastic adhesive coating from a continuous supply thereof to successive articles, which comprises feeding such tape from said supply, applying heat to said tape while it is feeding to activate said adhesive coating by progressively pressing the tape while under tension into contact with a heated surface, guiding said heated tape by contact with the uncoated surface thereof to and past severing means and into adhering relation with successive articles, severing said heated tape to leave a predetermined length thereof on each such article and progressively adhering under pressure a cut length of such tape to each such article.

22. Apparatus for applying thermo-activatable adhesive coated sheet material from a continuous supply thereof to successive articles, comprising means for supporting said supply, means for feeding the sheet material from said supply to a predetermined application point, means for conveying an article to said application point, means for applying heat to said sheet material so that the adhesive coating thereon is progressively activated as the sheet is fed from said supply, means for severing predetermined lengths from the leading activated end of said sheet, means separate from said feeding means for guiding the leading activated end of the sheet to a position to be adhered to the article at said application point by engagement with a portion of the sheet spaced from the portion of the sheet engaged by said feeding means and between said severing means and said application point, and means at said application point for adhering the leading activated portion of said sheet to the article.

23. Apparatus for applying thermo-activatable adhesive coated sheet material from a continuout supply thereof to successive articles, comprising means for supporting said supply, means for feeding the sheet material from said supply to a predetermined application point, means in advance of and beyond said feeding means for progressively applying tension to portions of the sheet engaged by said feeding means, means for pressing the tape into engagement with said feeding means, means for conveying an article to said application point, means including a heated surface for applying heat to said sheet material so that the adhesive coating thereon is progressively activated as the sheet is fed from said supply, means for progressively pressing the sheet against the heated surface, severing means between said heated surface and said point of application adapted to cut off an activated section of said sheet, and means for guiding the portion of the sheet beyond said severing means and for adhering the same to an article at said point of application.

24. Apparatus for applying thermo-activatable adhesive coated sheet material from a continuous supply thereof to successive articles, comprising means for supporting said supply, means for feeding the sheet material from said supply to a predetermined application point, means for conveying an article to said application point, means for applying heat to said sheet material so that the adhesive coating thereon is progressively activated as the sheet is fed from said supply, means for severing predetermined lengths from the leading activated end of said sheet, said feeding means including sheet reciprocatably gripping means located between said heating means and said severing means and movable longitudinally with said sheet in the direction of feed of the latter toward said severing means, means for guiding the leading activated end of the sheet to a position to be adhered to the article at said application point by engagement with a portion of the sheet spaced from the portion of the sheet engaged by said feeding means and between said severing means and said application point, and means at said application point for adhering the leading activated portion of said sheet to the article.

25. Apparatus for applying thermo-activatable adhesive coated sheet material from a continuous supply thereof to successive articles, comprising means for supporting said supply, means for feeding the sheet material from said supply to a predetermined application point, means for conveying an article to said application point, means for applying heat to said sheet material so that the adhesive coating thereon is progressively activated as the sheet is fed from said supply, means for severing predetermined lengths from the leading activated end of said sheet, said feeding means including an intermittently operable reciprocatably member located between said heating means and said severing means and movable longitudinally with said sheet in the direction of feed of the latter toward said severing means, said member engaging the uncoated surface of said sheet in the advancement of the sheet toward said severing means, and intermittently operable means contacting the adhesive side of the sheet during the advancement of said movable member and coacting with the latter to advance the sheet toward said severing means, and means at said application point for adhering the leading activated portion of said sheet to the article.

26. Apparatus for applying thermo-activatable adhesive coated sheet material from a continuous supply thereof to successive articles, comprising means for supporting said supply, means for intermittently feeding the sheet material from

*said supply to a predetermined article application point, heating means between said supply and said intermittent feeding means and including a member having a continuous heat-radiating surface, means for positively pressing one surface of the sheet material from said supply into contact with said heat-radiating surface, means for rotating said heat-radiating surface, and means between said intermittent feeding means and said application point for severing predetermined lengths of the leading activated end of said sheet.*

*27. Apparatus for applying thermo-activatable adhesive coated sheet material from a continuous supply thereof to successive articles, comprising means for supporting said supply, means for feeding the sheet material from said supply to a predetermined application point, means for conveying an article to said application point, means for applying heat to said sheet material so that the adhesive coating thereon is progressively activated as the sheet is fed from said supply, means for severing predetermined lengths from the leading activated end of said sheet, said feeding means including a member located between said heating means and said severing means and having a reciprocatably planar sheet engaging portion movable with said sheet in the direction of feed of said sheet toward said severing means and engageable with one surface of said sheet, a reciprocatably movable member engageable with the other side of said sheet to press said sheet against said planar sheet engaging portion, and means to cause said movable member to engage such sheet during the advancing movement of said planar sheet engaging portion and to disengage such sheet in the return movement of the latter, and means at said application point for adhering the leading activated portion of said sheet to the article at said application point.*

*28. Apparatus for applying thermo-activatable adhesive coated sheet material from a continuous supply thereof to successive articles, comprising a frame, means for supporting said sheet supply on said frame, means for feeding the sheet material from said supply to a predetermined point for application to an article, a heater intermediate said sheet supply and said application point, said heater having an elongated heating surface engageable by a substantial length of said sheet material during the activation of the adhesive material thereon and stationary guide means mounted on said frame adjacent the ends of said heating surface engaged by said sheet material for cooperation with said heating surface to maintain said sheet under tension effective to cause pressure contact between such sheet and said heating surface for softening said coating.*

References Cited in the file of this patent or the original patent

UNITED STATES PATENTS

| Number | Name | Date |
|---|---|---|
| 1,266,735 | White | May 21, 1918 |
| 1,281,780 | Jean | Oct. 15, 1918 |
| 1,752,139 | Anderson | Mar. 25, 1930 |
| 1,968,881 | Edwards | Aug. 7, 1934 |
| 1,969,660 | McLaurin | Aug. 7, 1934 |
| 2,083,618 | Salfisberg | June 15, 1937 |
| 2,103,629 | Malocsay | Dec. 28, 1937 |
| 2,123,415 | Gorbatenko | July 12, 1938 |
| 2,125,758 | Waters | Aug. 2, 1938 |
| 2,145,781 | Schuneman | Jan. 31, 1939 |
| 2,224,370 | Wescott | Dec. 10, 1940 |
| 2,235,704 | Gorbatenko et al. | Mar. 18, 1941 |
| 2,248,744 | Cohen | July 8, 1941 |
| 2,376,253 | Humphrey | May 15, 1945 |